(12) United States Patent  
Figarella et al.

(10) Patent No.: US 8,238,949 B1  
(45) Date of Patent: Aug. 7, 2012

(54) INTERNATIONAL TEXT MESSAGING BRIDGE SYSTEM

(76) Inventors: Elizabeth Figarella, Nashua, NH (US); Luis Figarella, Nashua, NH (US)

( * ) Notice: Subject to any disclaimer, the term of this patent is extended or adjusted under 35 U.S.C. 154(b) by 115 days.

(21) Appl. No.: 12/776,391

(22) Filed: May 9, 2010

Related U.S. Application Data

(60) Provisional application No. 61/176,920, filed on May 10, 2009.

(51) Int. Cl.
  *H04W 4/00* (2009.01)
(52) U.S. Cl. .................. 455/466; 455/414.1; 455/403; 455/445; 455/561
(58) Field of Classification Search .............. 455/414.1, 455/403, 466, 445, 561
  See application file for complete search history.

(56) References Cited

U.S. PATENT DOCUMENTS

| 7,127,494 B1 | 10/2006 | Aronsson |
| 7,912,464 B2 * | 3/2011 | Jiang .......................... 455/432.1 |
| 2003/0036394 A1 * | 2/2003 | Henry-Labordere ......... 455/466 |
| 2003/0220979 A1 | 11/2003 | Hejl |
| 2005/0119017 A1 * | 6/2005 | Lovell et al. .................. 455/466 |

OTHER PUBLICATIONS

Pinger, Blog posted on Mar. 15, 2009 (2 pages) downloaded from online http://www.appcraver.com/textfree-unlimited/ on Nov. 21, 2011.*
Pinger, Press Release, Jun. 11, 2009 (2 pages) downloaded from online http://www.pinger.com/content/company/press/press_releases/pr_06172009.html on Nov. 21, 2011.*

* cited by examiner

*Primary Examiner* — Kamran Afshar
*Assistant Examiner* — Manpreet Matharu
(74) *Attorney, Agent, or Firm* — Luis Figarella

(57) ABSTRACT

At present, there exist systems which send SMS text messages across national boundaries and telephonic carriers from one mobile phone operator to another. The proposed system would create a series of real number to virtual number(s) mappings, allowing the sending and receiving of messages across national borders without incurring international charges.

2 Claims, 5 Drawing Sheets

In the US

| User ID | LuF |
|---|---|
| Handset # | 603 557 8420 |
| Country | USA |
| E-mail | luis@figarella.com |
| Handset E-mail | 16035578420@vtext.com |
| US Virtual | None |
| Arg. Virtual # | (011 54 1) 5 6282 7777 |
| DR Virtual # | (1) 809 696 7777 |
| Translation Tables | 253 4 9824 5.6282.7444<br>1 212 345 8888 ←→ 1 809 696 7780 |

Figure 4

In Argentina

| User ID | RaulG |
|---|---|
| Handset # | 5 6282 7444 |
| Country | Argentina |
| E-mail | raulg@arnet.com.ar |
| Handset E-mail | None |
| US Virtual | 253 484 9824 |
| Arg. Virtual # | None |
| DR Virtual # | None |
| Translation Tables | 5 6282 7777 ←→ (1) 603 557 8420 |

Figure 5

In the DR

| User ID | TiaSonia |
|---|---|
| Handset # | 809 696 7780 |
| Country | Dominican Republic |
| E-mail | tiasonia@dr1.com |
| Handset E-mail | None |
| US Virtual | 212 345 8888 |
| Arg. Virtual # | None |
| DR Virtual # | None |
| Translation Tables | 809 696 7777 ← → (1) 603 557 8420 |

Figure 6

INTERNATIONAL TEXT MESSAGING BRIDGE SYSTEM

CROSS-REFERENCE TO RELATED APPLICATIONS

This application claims priority to U.S. provisional patent application Ser. No. 61/176,920 titled "International Text Messaging Bridge", filed on May 10, 2009, the disclosure of which is incorporated herein by reference in its entirety.

PATENTS CITED

The following documents and references are incorporated by reference in their entirety, Aronsson (U.S. Pat. No. 7,127,494), and Hejl (U.S. Pat. Pub. 2003/0220979).

TECHNICAL FIELD

The present invention generally relates to the field of mobile device text messaging. In particular, the invention relates to the design and implementation of an international bridge system allowing parties to text between devices located in different countries without incurring international texting charges.

BACKGROUND

Texting between handsets via wireless networks (in the various implementations comprising such services as SMS (Short Message Service), ANSI CDMA and others) has become a very popular method of communication. Devices with full keyboards, such as Blackberries and iPhones have in many places increased the popularity of texting by facilitating the ease of sending messages.

In many countries cell plans now cover all intra-country texting from a device for a flat fee or relative low cost. Similar plans cover the sending of text messaging to e-mail destinations, whether they be other mobile devices (such as those addressed to 16035551212@vtext.com, which are then delivered by the cell system to the handset connected to the Verizon cell network having cell number 603.555.1212 in the US cell network), or to regular e-mail addresses that may or may not be mobile.

Unfortunately for customers with friends in other countries, cell phone carriers charge significant per message fee for texting to cellphone numbers located in other countries. In this fashion, someone texting a friend in Argentina from the US, is forced to pay $0.40 cents per message using a service like Verizon or Sprint.

A need exists for a system that would allow users to avoid paying per-message texting charges when sending text messages to numbers in other countries, and for their friends to respond to the message in a similar fashion, all without requiring the use of the international services provided by the cell carriers.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the present invention allows users to obtain a virtual telephone number within the country they want to SMS text and tie it to their originating (real) cellular handset number within their country's cellular network. Any two users having such virtual numbers in two different countries will then be able to "pair" them through the system, and send SMS text messages to each other without international charges.

In another aspect an information deliver system connected to a one or more communication networks comprising a first telephone system interfacing gateway capable of replicating the functions of one or more telephone handsets under the unique telephone assignment system of a first country's telephonic system, including sending and receiving SMS text messages within said first country a second gateway, capable of performing the same functions as the first gateway, but within a second country's telephonic system, communication means between the first and the second country gateways, computer processing means within the first gateway for receiving the SMS text message from the handset within a cellular network in the first country, ascertaining the destination's country receiving number associated with the first country's replicated number, translating the receiving/transmitting number identifier on the SMS text message from the real/replicate pairing of the first country to the replicate/real pairing of the second country and transmitting this as a virtual SMS text message to the second country gateway and computer processing means residing in the second gateway for receiving the message from the first gateway, and sending the SMS text message to the real destination handset using the virtual number within the second country's cellular network as the originating number.

In another aspect, the information deliver system is as above, but the translation of the numbers from real/virtual in the first country to virtual/real in the second country is done within the computer gateway of the second country.

In another aspect, the invention allows users to send text messages number in another country via an alternate route, allowing for such text messages to be identified as coming from the in-county virtual number within the recipient's country's phone network.

Other objects, features and advantages of the present invention will become apparent upon examining the following detailed description of an embodiment thereof, taken in conjunction with the attached drawings. The present invention may be implements in many forms including a device, method, or part of a device.

BRIEF DESCRIPTION OF THE DRAWINGS

The foregoing discussion will be understood more readily from the following detailed description of the invention with reference to the following drawings

FIGS. 4-6 show illustrations of the individual country's interfacing database tables, according to an exemplary embodiment of the invention.

DETAILED DESCRIPTION

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
FIG. 1 shows an illustration of a typical wireless device multi-tap keyboard.

In almost all implementations, wireless devices allow the sending of text message entered via the device keyboard. While text is more easily entered in devices with an alphanumeric keyboard (such as a QWERTY one that replicates a typewriter or computer keyboard), many numeric only keypads in handsets allow this via so called "multi-tap" keyboards, which contain sets of three or four letters under a particular number. FIG. 1 illustrates a common multi-tap keyboard. The user interface in the device allows the user to cycle through a series of letters each time the key is pressed, thus allowing the entering of text in the message.

Figure 2:
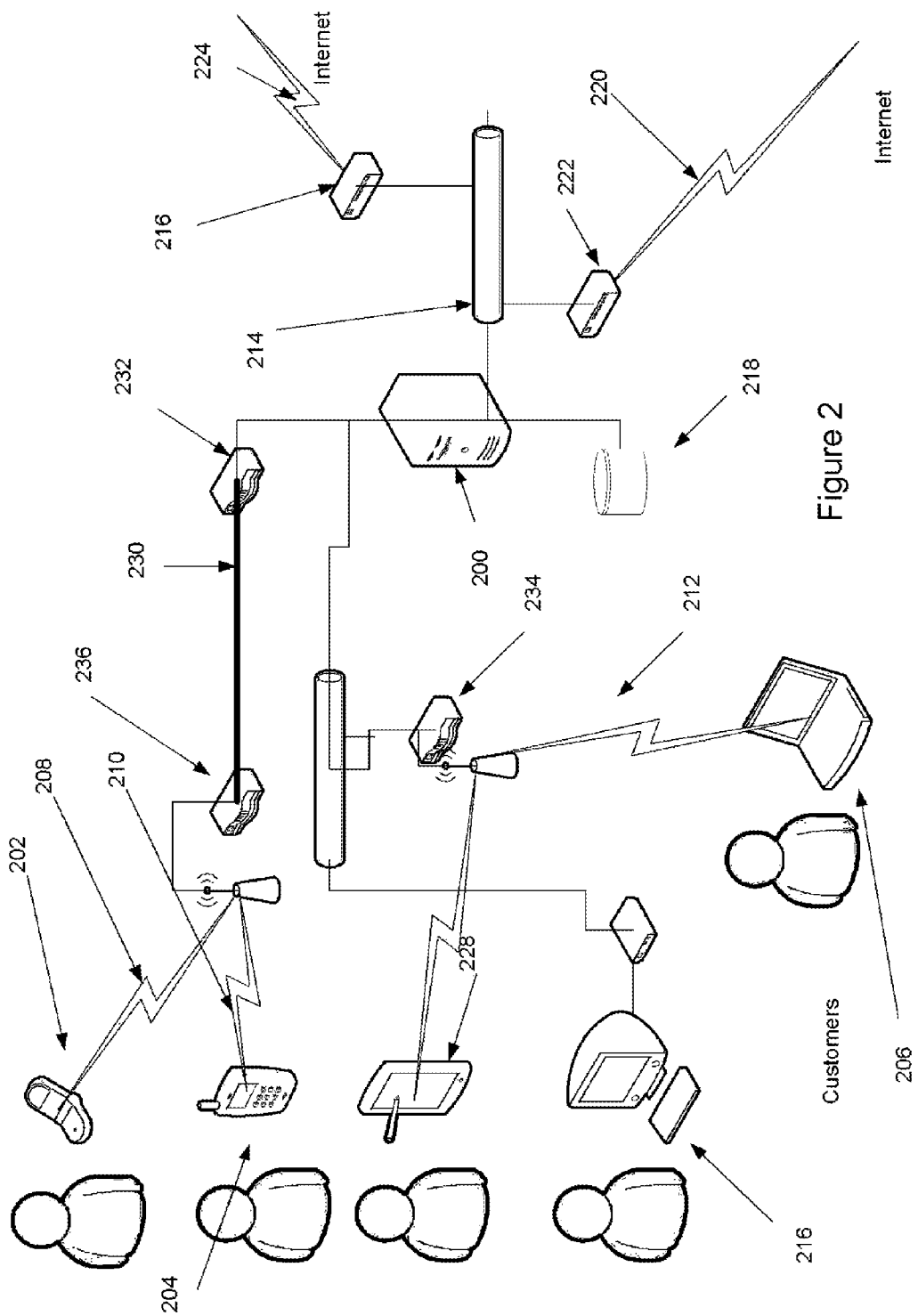
FIG. 2 shows an illustration of the communication system within a first country, according to an exemplary embodiment of the invention.

FIG. 2 illustrates the typical architectural layout of a wireless network, and one exemplary embodiment for the system within a first country. In it, mobile devices and handsets that are connected to various communication networks (including cellular, Wi-Fi, Imax, Ethernet, and other both wireless and wired networks) are shown connected to a first telephone system interfacing gateway 200. The various communication networks connect to the system gateway 200 in a variety of ways. One way is the traditional cellular network, where handset 202 are linked by one or more cellular protocols 208. These links (208) may be comprised of the GSM, CDMA, TDMA, CDPD or any other cellular protocol capable of allowing SMS text messages to be sent via them.

In recent time, the handsets 204 may also be linked to the wireless gateway 200 through a digital cellular network such as the 3G or 4G data network 210. Such a third generation (3G) or fourth generation (4G) network allows for a more efficient data connection. While in many cases this is enabled via an internet protocol (with e-mail-type addresses), for convenience purposes a wireless or cellular operator may opt to transparently connect text messages through their 3G/4G network if required, without allowing the user to know the different path.

Another way for the device 206 or handset 228 (which may be a device like an iPhone or Blackberry) is to link via a connection through a digital link 212, such as Wi-Fi (802.11-type protocol), or Imax (801.16-type protocol). Such a link may or may not go directly to the CG 200, but it would for architectural purposes tie into the cell service.

Finally, a user sitting at their computer 216 may also use an internet connection to connect to the country gateway 200 using a browser page that emulates their phone interface.

Such a network allows for the addressing of text messages in a number of ways. The most common, is to address them to the telephony identifier of the handset within its network. Under the agreed International conventions, telephone numbers, i.e. the unique numerical identifier for a handset in a wireless network are unique.

For example, a US telephone is identified by its country code (1 for the US, after all Mr. Gray invented the phone in the US), its numeric area code ABC (e.g. 603 for a telephone registered to a New Hampshire area code), and the seven digits that ID the handset XXX-YYYY within that area code, where XXX is the exchange). In this fashion, the unique identifier for a US handset worldwide are the numbers 1ABCXXXYYYY.

Similarly, a handset located in Argentina would be identified by its country code (54), its mobile access code (9 or 5) and then the eight digits DDDD EEEE which identify Argentineans telephones. Thus, globally, a telephone having the number 54 5 DDDDEEEE uniquely identifies the Argentinean handset.

Each country requires specific steps to call or text globally. For example, when texting the above Argentinean number from the USA, cell providers require the preface 011 (or the symbol +) to identify the customers request to text internationally.

Figure 3:
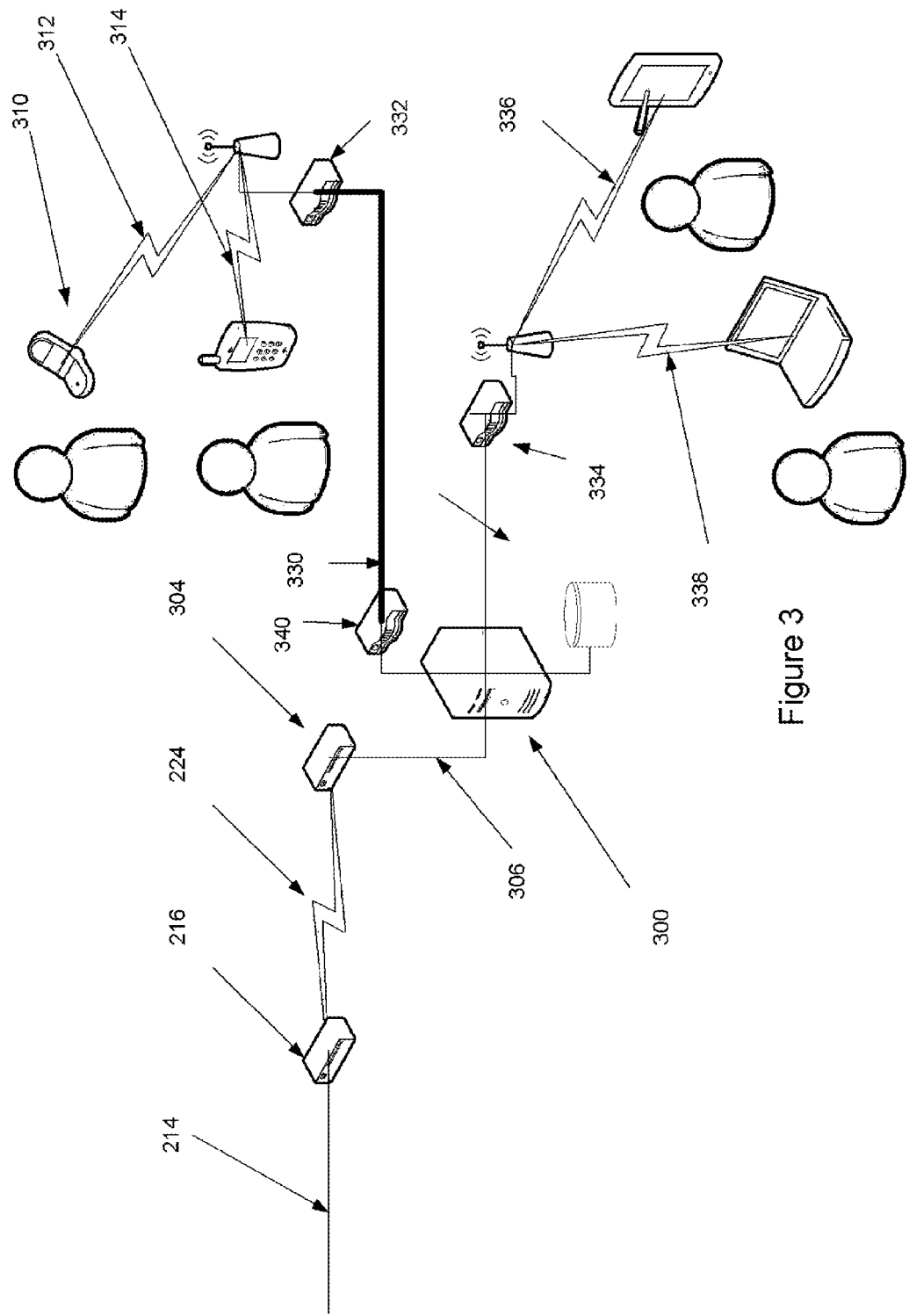
FIG. 3 shows an illustration of the communication system within a second country, according to an exemplary embodiment of the invention.

FIG. 3 illustrates an exemplary embodiment of the invention at a second gateway which receives the SMS text message from the first. To use the system, in one embodiment, potential users (we'll call him/her a sender) register with the International Texting (ITXT) system, using a unique ID (preferably an e-mail, but a handset ID number may also be used).

The key to the implementation of the system, is the creation of a real number to virtual cell phone number pairing for each user within each desired country of operation. In one embodiment, the user has a real handset within at least one country, that of their residence. In an alternate embodiment, all the numbers are virtual, and the user does all communication from a computer page. The virtual handsets are created by leasing telephone numbers (the unique identifiers described above), in each country of interest and having interface computer and electronic circuits 232 to interface with the country's telephonic backbone network 230 in the same way that the other cell numbers within the country interface to it.

Thus, in one aspect, user A with a cell phone handset 202 having a registered number X (say (1) 603 557 8420 in the US) using the Verizon 208 cellular network in the US, registers through the system to have a virtual number X' (say (54 1) 5 6282 7777 in Argentina (or one, of course different, in each country in the world, according to the local telephone number rules). User B with a cell phone handset 310 having registered number Y (say (54 1) 5 6282 7444 in Argentina using Argentina's Telefónica cellular network, registers to have a virtual number Y' (say (1) 253 484 9824 in the US (and others in any other country desired).

User B informs user A (and anyone, that her contact numbers are Y and Y' (perhaps through user B's Facebook page). When user A wants to contact user B's, instead of texting to number Y (at 40 cents a text), she texts to number Y' (which is also in the US, and costs user A nothing extra) from her handset 202. The message travels through the Verizon network 208 to a Verizon gateway 236. The Verizon network then uses the standard backbone 230 to send the text to the number Y'. The Verizon system is unaware of who owns the number, treating as if it were a cell number from Sprint, AT&T or anybody.

The interface computer and electronic circuits 232 are part of the IXTX system's first country gateway 200. Within it, the gateway 200 has a translation table that identifies the owner's country and registered handset number for messages coming to number Y', as well as the virtual number X' of the number X that the message is coming from.

The US gateway 200 then proceeds to send to the Argentinean gateway 308 the translated message information (a message for Y now coming from X') via the Internet using Ethernet link 214 to internet adapter 216 (may be a cable modem or such other adapter) through Internet link 224. Within Argentina, the Internet link 224 reaches an internet adapter 304 which links to an Ethernet link 306 and system gateway 308. The gateway recognizes the SMS text message as going to be delivered to number Y in Telefónica's network as coming from number X'. It proceeds to do this by interfacing via adapter 340 to the Argentinean backbone 330 which delivers the message to Telephonic. Telephonic, like Verizon in the US, transmits the message over its cellular network 312 to handset 310 (which operates using the number X) as if it was coming from another of Argentina's cell network providers.

User B receives the message from number X', and when responding, responds to number X' (incurring any charges as local SMS text number within Argentina). The response is (just as in the US), received by the Argentinean gateway 308 (which operates the gateway number X', determines it to belong to a "real" number in the US, and sends it to the US gateway. As before, the country gateway 308 performs the translation, now sending a message to X as coming from number Y'.

Thus in embodiment, the SMS text message begins in the first country as a real/virtual pairing, and is translated before sending overseas into a virtual/real pairing in the second country. In an alternate embodiment the real/virtual translation is done in the second country. In an alternate embodiment, the translation is done within a third (and separate country), with the translated real/virtual to virtual/real sent to the second country for delivery. The critical advantage of all of the above, is that the user in the second country receives messages as coming from a number in their country, thus is able to respond to them without extra costs or work.

In one embodiment, the sender is provided with a virtual number in every country they register as wanting to text to. This in-country sender virtual number is linked to the sender's ITXT system account information. Any text sent to a number in that country, will appear to the recipient as coming from the sender's in-country number. If the recipient has an ITXT account, and a virtual number in the sender's country, any reply is sent by the recipient (now replying) to the sender's in-country virtual number, routed by the ITXT system back to the original sender handset (via the ITXT system) in the sender's home country, using now the recipient's virtual number in the sender's country as the reply-to number. In this fashion, we have now established a real-number, virtual-number round-back link.

In the above fashion, the local wireless network reacts to this text message as it would to any other "in-country" message, by forwarding it to the other "local" number. At this stage, the gateway that receives this number within the same country proceeds to do a number of things, based on the instructions it has for this number (which are configured either automatically, by the user to whose account this number belongs, or otherwise). In one embodiment, the user's account may be modified for vacations, or even for travel, by establishing that any messages coming to this number, must be sent to another number in the same country. At this point, the gateway does that by forwarding the message, either via its own connection or a leased connection to the wireless network.

In another embodiment, the sender is assigned a sender ID (may be the sender ITXT ID, e-mail, or the sender handset ID among others), and the ITXT system then uses a general number within recipient's country where the message is forwarded to as the in-country reply-to number. This reduces the number of virtual numbers, but forces the replier to include some information about the reply-to identity (be it the handset ID, user ID or something else) in order for the recipient country IP Gateway to correctly forward the message back to the sender.

Upon determining that the country is served by the ITXT system, the service then checks to see if the recipient is already in the system, and in the recipient's country. If so, the sender is informed of the recipient's virtual number in the country, and thus he can simply text the recipient internationally avoiding international charges by texting the recipient's virtual number in the recipient's country.

If the ITXT system serves the country, but the recipient does not have a virtual number, the sender is registered with a virtual number in the recipient's country. A message is then sent to the recipient from this virtual number, with the body text indicating that the message actually comes from the sender's actual number, and instructions for allowing future messages from the address. By responding (and later originating) texting messages to that in-country virtual number, the text will be internationally delivered to the phone linked to the sender's handset in the original country registered in the ITXT system. In one embodiment, the first time, non-registered recipient may receive a general message asking them to become members of the ITXT system, including URL and special offers.

In one embodiment, the system may reduce the number of virtual numbers by creating a sub-header where the originating handset ID or user ID is added to a block in the message (say the beginning), and this would allow the person to reply to a "public" virtual number where the ITXT system would then perform the routing function.

In an alternate embodiment, where the recipient is based in the US, and his/her provider accepts routing via e-mail, the IP Gateway 308 in Argentina may simply package the message and send it to the recipient as an e-mail identifying the sender's virtual number (and real ID). If the recipient is not allowed to receive e-mail formatted texts, the ITXT system then uses the sender's virtual number in the recipient's country to send the message. If the sender does not have a virtual number in that country, in one embodiment the sender is encouraged to sign up for one. In another embodiment, the message is delivered using a general number (one not assigned to a specific user but to the ITXT system), with the message text having the URL for the ITXT service, the sender's information, and instructions to sign up.

In another embodiment, the sender's ID is included in the header, and the receiver desiring to reply simply make sure the sender's ID is included in a specified portion of the message, allowing the ITXT system to receive the message at the general number and route it accordingly.

In another embodiment, the user controlling this in-country number in Argentina, has specified that all messages coming to it be delivered to a number in the US. The gateway then proceeds to either send the message via an e-mail (as is possible with a number of cell phone providers, e.g. Sprint would allow a message to be sent from Argentina to its network via the 1ABCXXXYYYY@vtext.com, as do others), or if the cell provider does not allow it, the text message may be sent via a connection to the wireless network within the US.

To set up the system, a user U signs up and registers the unique identification information for their handset, as well as optionally their e-mail. They then provide the name of at least one country to which they would like to send text messages. If service exists in that country, the service then proceeds to provide user U with a virtual number (say UUUUVVVV, since that number may or may not be a cellular/wireless/mobile number) in that country. This is repeated for all the countries of interest to U (with of course a different number in each country).

In one embodiment, the user proceeds to then notify all his contacts in each particular country of his "in-country" virtual number (preferably by e-mail, although international texting, voice, fax, and even postal may comprise other methods to accomplish this). Now, user U may text his/her contacts in other countries (still paying International rates), but allow them to text back to him for free (by replying to his/her in-country number).

If his contact, say user A (with handset ID 5 XXXX YYYY) in Argentina, wants to reciprocate, user A there proceeds to enter the service, and register the Argentina number (above) with the service, request a virtual number in the US (say 1 603 ZZZ AAAA), and link her Argentina handset number with the virtual number in the US, informing user U about it, or having the service do this.

Now, to send in-country text to each other, user A text's user U Argentina's virtual number, where the text is received by the Argentina computer and either sent to 1ABCXXXYYYY@vtext.com (user's U handset identity), or passed via the Internet to the service US gateway, where the service has either a partner or access to equipment that can text 1 ABC XX XYYYY at minimal or no cost. User U, receives the text, and replies to user A, but not by using the 5 XXXX YYYY (which would incur international text charges), but by using A's US 1 ABC XXX YYYY number. The US gateway receives this message, sends it to its Argentina gateway (say as an attachment to a message, or as an internal posting to a database, or as a private communication), and that gateway proceeds to use its local connection (and knowledge of A's local Argentina number 9 XXXX YYYY) to deliver the message to the handset. FIG. 4 illustrates the database entries and links of three users in the system.

Of course, payment for the services must be ensured. In one embodiment, this is done by charging users a regular membership fee. User's pay a certain amount per virtual number in each country. In one embodiment, a per message rate is charged. In one embodiment, the user is required to view a certain number of pages within a certain period of time, in order to keep his account charged with enough credits (which are then used to pay for messages sent to different countries on a per-country basis).

Note that while the received message in the handset is a text message, other files and attachments, including faxes sent to the virtual number or voice mails left at the virtual number may be sent to the virtual number (via a fax machine or by calling the number and leaving a message), transferred by the system to the recipient via e-mail attachment or private application, and a notification of the action sent to the recipient via an automated ITXT message notification received in the recipient's handset.

As with social networks, users may opt to allow the security setting of the service to find virtual numbers for their friends via searching for names, numbers, e-mails, addresses or any other information users may desire to share with others, allowing them to link with many. In addition, users may post their virtual numbers per country in their social sites (e.g. LinkedIn, Facebook, and others), their company's web-site, and other places.

Various embodiments and features of the present invention have been described in detail with a certain degree of particularity. The utilities thereof can be appreciated by those skilled in the art. It should be emphasized that the above-described embodiments of the present invention merely describe possible examples of the implementations to set forth a clear understanding of the principles of the invention, and that numerous changes, variations, and modifications can be made to the embodiments described herein without departing from the spirit and scope of principles of the invention. Also, such variations and modifications are intended to be included herein within the scope of the present invention, as set forth in the appended claims. The scope of the present invention is defined by the appended claims, rather than the forgoing description of embodiments. Accordingly, what is desired to be secured by Letters Patent is the invention as defined and differentiated in the following claims, and all equivalents

The invention claimed is:

1. An SMS text message information delivery system connected to a one or more communication networks comprising;
   a first telephone system interfacing gateway, said first gateway receiving SMS text messages originating from real first country telephone handsets within said first country's telephonic system, said first gateway also replicating the functions of one or more first country virtual telephone handsets operating within said first country, said first country virtual handsets having telephone numbers assigned within said first country's unique telephone assignment system, including the ability of sending SMS text messages having said first country's ID as an identifier within said first country's telephonic system;
   a second telephone system interfacing gateway, said second gateway receiving SMS text messages originating from real second country telephone handsets within said second country's telephonic system, said second gateway also replicating the functions of one or more second country virtual telephone handsets operating within said second country, said second country virtual handsets having telephone numbers assigned within said second country's unique telephone assignment system, including the ability of sending SMS text messages having said second country's ID as an identifier within said second country's telephonic system;
   communication means between said first and said second country gateways;
   computer processing means within said first gateway for receiving SMS text messages originating from real first country telephone handsets within a cellular network in said first country, determining the second country and second real handset number associated with said first country virtual handset number, ascertaining the appropriate second country destination gateway based on each said first virtual numbers properties, determining the assigned second country virtual number for said first country real telephone handset originating the SMS text message and if one exists transmitting said original message and relevant associated real/virtual paired ID data via said communication means to said second gateway;
   computer processing means residing in said second gateway for receiving said SMS text message and associated paired first/second country real/virtual paired ID data from said first gateway via said communicating means, generating a new SMS text message having the same message content as the original SMS text message, and transmitting it through the second country's telephonic system as an SMS text message originating from said second country's virtual handset's identifier associated with said first country's real handset as an SMS text message to the second country destination real handset within said second country's cellular network.

2. The system of claim 1 wherein;
   if the first real number does not have a second country assigned virtual number, said second gateway assigns an available second country virtual number and communicates the real/virtual paired ID throughout the system via the communication means.

\* \* \* \* \*